United States Patent
Segall et al.

(10) Patent No.: US 9,122,801 B2
(45) Date of Patent: Sep. 1, 2015

(54) TEST PLANNING WITH ORDER COVERAGE REQUIREMENTS

(71) Applicant: International Business Machines Corporation, Armonk, NY (US)

(72) Inventors: Itai Segall, Tel-Aviv (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 13/960,836

(22) Filed: Aug. 7, 2013

(65) Prior Publication Data

US 2015/0046906 A1 Feb. 12, 2015

(51) Int. Cl.
*G06F 9/44* (2006.01)
*G06F 11/36* (2006.01)

(52) U.S. Cl.
CPC ........ *G06F 11/3676* (2013.01); *G06F 11/3688* (2013.01)

(58) Field of Classification Search
CPC .......................... G06F 11/3688; G06F 11/3676
USPC ........................................ 717/124; 714/25, 46
See application file for complete search history.

(56) References Cited

U.S. PATENT DOCUMENTS

| | | | | |
|---|---|---|---|---|
| 5,913,023 | A * | 6/1999 | Szermer ........................ | 714/38.1 |
| 6,577,982 | B1 * | 6/2003 | Erb .............................. | 702/120 |
| 6,928,393 | B2 * | 8/2005 | Czerwonka ................... | 702/186 |
| 7,024,589 | B2 * | 4/2006 | Hartman et al. ............... | 714/32 |
| 2003/0233600 | A1 * | 12/2003 | Hartman et al. ............... | 714/32 |
| 2004/0260516 | A1 * | 12/2004 | Czerwonka ................... | 702/186 |
| 2006/0101397 | A1 * | 5/2006 | Mercer et al. ................. | 717/120 |
| 2010/0274520 | A1 * | 10/2010 | Ur et al. ....................... | 702/123 |
| 2011/0231708 | A1 * | 9/2011 | Lawrance et al. ........... | 714/38.1 |
| 2012/0324286 | A1 * | 12/2012 | Birnbaum et al. ............. | 714/26 |

OTHER PUBLICATIONS

Ziyuan et al., "Generating Combinatorial Test Suite for Interaction Relationship", 2007.*
Ziyuan et al., "Greedy Heuristic Algorithms to Generate Variable Strength Combinatorial Test Suite", 2008.*
Segall et al., "Using Binary Decision Diagrams for Combinatorial Test Design", 2011.*
Kuhn et al., "Combinatorial Methods for Event Sequence Testing", IEEE Fifth International Conference on Verification and Validation ICST, 2012, pp. 601-609.
Kruse et al., "Multi Objective Algorithms for Automated Generation of Combinatorial Test Cases with the Classification Tree Method", SSBSE 2011: The 3rd International Symposium on Search Based Software Engineering, pages, Sep. 12, 2011.

(Continued)

*Primary Examiner* — Phillip H Nguyen
(74) *Attorney, Agent, or Firm* — Noah A. Sharkan

(57) ABSTRACT

A method, apparatus and computer-implemented method, the method comprising: receiving a combinatorial testing model comprising an attribute collection, the attribute collection comprising a predetermined number of initial attributes, one or more possible values for each of the initial attributes, a coverage requirement, and an order coverage requirement for the initial attributes, the order coverage requirement related to predetermined relative order in which the attribute values are to be applied; and providing two or more tests in which each of the initial attributes is assigned a value from the possible values, wherein the tests satisfy the order coverage requirement for the at least two attributes.

12 Claims, 3 Drawing Sheets

(56) References Cited

OTHER PUBLICATIONS

Yu et al., "Efficient Algorithms for T-Way Test Sequence Generation", 17th International Conference on Engineering of Complex Computer Systems ICECCS, 2012, pp. 220-229.

Wang et al., "An Interaction-Based Test Sequence Generation Approach for Testing Web Applications", IEEE International Conference on High Assurance Systems Engineering, Nanjing, China: IEEE Computer Society, 2008, pp. 209-218.

* cited by examiner

significance, current CTD technologies do not take into account the order in which values for the attributes are set.

TEST PLANNING WITH ORDER COVERAGE REQUIREMENTS

TECHNICAL FIELD

The present disclosure relates to testing in general, and to a method and apparatus for determining combinations of values for attributes in combinatorial models wherein the order of the attributes is important, in particular.

BACKGROUND

Computerized devices control almost every aspect of our life—from writing documents to controlling traffic lights. However, computerized systems are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized system. Additionally, a bug in hardware or firmware of a marketed product may be expensive to fix, as patching it requires call-back of the computerized device. Hence, many developers of computerized systems invest a substantial portion of the development cycle to discover erroneous behaviors of the computerized device.

An important part of testing relates to test planning and design, i.e., providing a set of tests that adequately cover the system, such that if all tests pass, the system is assumed to be operative. However, it is generally required to increase testing efficiency and reduce the number or total cost of the tests as much as possible.

A common methodology for test planning and design comprises the usage of combinatorial models, also referred to as Cartesian-product models, which may be used when describing a problem as a set of attributes or properties, values corresponding to the attributes, and possibly restrictions on combinations of values that may not appear together in a test. Each test comprises a value for each attribute, such that the combination represents a particular situation. Thus, a test may be represented as a tuple in which every attribute is assigned a value. The model thus spans a space of valid tests, being the value assignments that do not violate any restrictions.

Combinatorial models may be used as input to Combinatorial Test Design (CTD), a test planning technique that selects a subset of the valid test space which covers all interactions up to a certain level, which may be user-defined. Another important usage is for analysis of functional coverage of systems.

The CTD may thus output a test suite comprising a fraction of the test space that meets the coverage requirements. Coverage requirements may be given as a level of interaction, where, e.g., a "level 2" requirement stands for "for every pair of attributes, cover every possible pair of values".

A test in this setting is a mere assignment of a value for each attribute. The order in which the attributes are set is often of significance, but is not handled by current approaches. For example, in a graphic user interface in which a user has to select a state and a city, the behavior of the system may change depending on the order in which the fields are set. For example, before a state is selected, the city list may show all possible cities (or no city), while after a state is selected the city list contains cities from the selected state. Despite its significance, current CTD technologies do not take into account the order in which values for the attributes are set.

BRIEF SUMMARY

One aspect of the disclosure relates to a computer-implemented method performed by a computerized device, comprising: receiving a combinatorial testing model comprising an attribute collection, the attribute collection comprising a predetermined number of initial attributes, one or more possible values for each of the initial attributes, a coverage requirement, and an order coverage requirement for at least some of the initial attributes, the order coverage requirement related to predetermined relative order in which the attribute values are to be applied; and providing two or more tests in which each of the initial attributes is assigned a value from the possible values, wherein the at least two tests satisfy the order coverage requirement.

Another aspect of the disclosure relates to an apparatus having a processing unit and a storage device, the apparatus comprising: receiving a combinatorial testing model comprising an attribute collection, the attribute collection comprising a predetermined number of initial attributes, one or more possible values for each of the initial attributes, a coverage requirement, and an order coverage requirement for at least some of the initial attributes; and a test design engine for performing test design for the testing model, to obtain two or more tests in which each of the initial attributes is assigned a value from the possible values, wherein the tests satisfy the order coverage requirement.

Yet another aspect of the disclosure relates to a computer program product comprising: a non-transitory computer readable medium; a first program instruction for receiving a combinatorial testing model comprising an attribute collection, the attribute collection comprising a predetermined number of initial attributes, one or more possible values for each of the initial attributes, a coverage requirement, and an order coverage requirement for at least some of the initial attributes, the order coverage requirement related to predetermined relative order in which the attribute values are to be applied; a second program instruction for providing two or more tests in which each of the initial attributes is assigned a value from the possible values, wherein the tests satisfy the order coverage requirement, and wherein said first and second program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
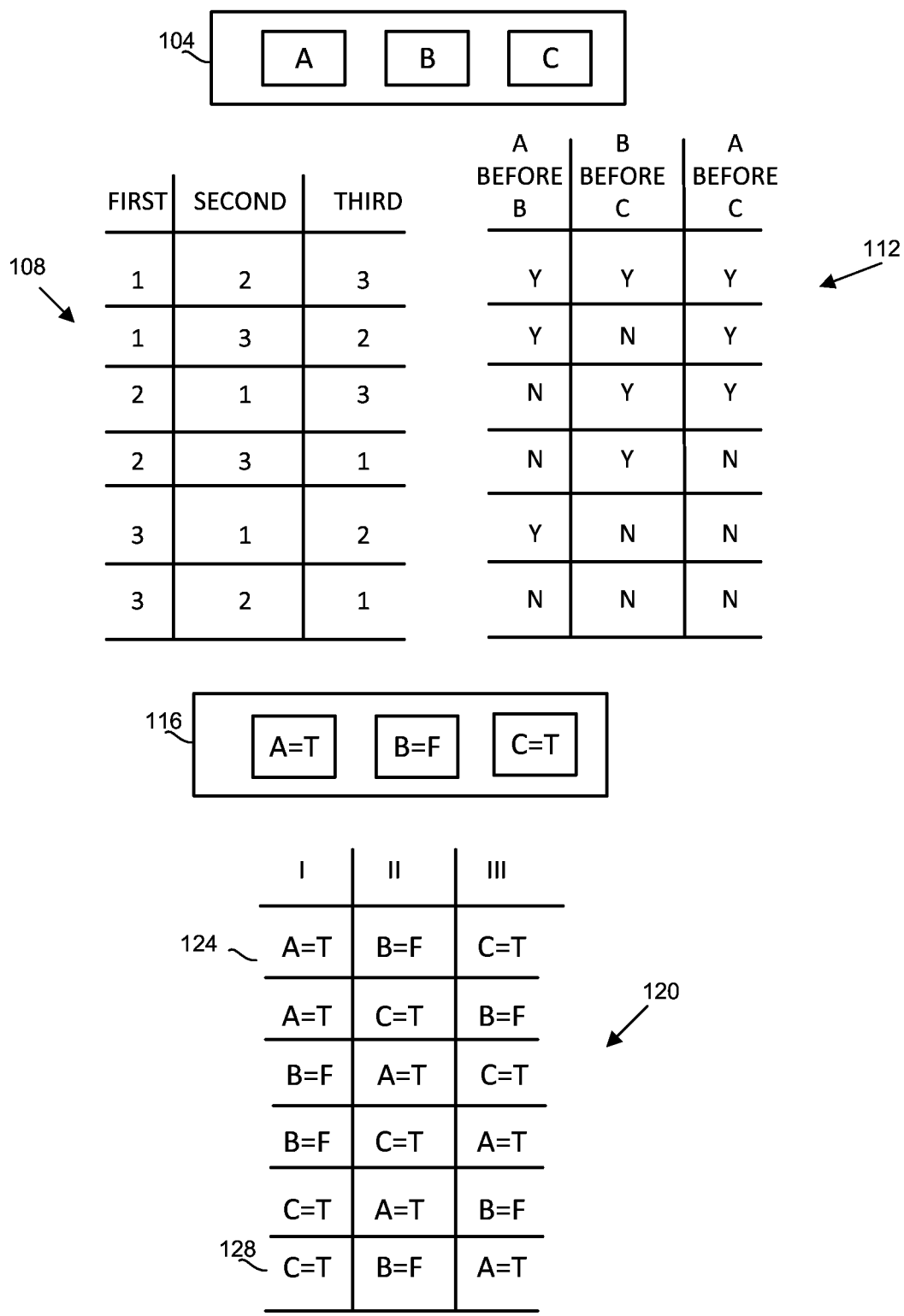
FIG. 1 shows an illustration of an exemplary embodiment for planning a test with order coverage requirements, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter relates to deploying CTD, in situations wherein order coverage requirements for one or more attribute value combinations are to be applied. Such situations may include systems in which the order in which attributes are set implies a scenario of events rather than a mere configuration. Exemplary situations may include a user interface in which the value set in one control affects values enabled listed or otherwise affecting other controls. Another exemplary application may include a computer network comprising computers of different types, such that each test has to indicate not only which computers are to be powered, but also the order in which the computers are to be powered. It will be appreciated that the order coverage requirements may relate to some or all the attributes, and regarding particular attributes to some or all the values. For example, it may be required that a particular value combination may be tested at any one arbitrary order, while another value combination has to be tested in all orders of the relevant attributes.

One technical solution comprises planning a test suite in which, in addition to combination coverage requirements, combination order coverage requirements are imposed and met. The test suite is planned for a testing model comprising attributes, values and restrictions, including order restrictions. The output is a collection of tests in which at least two tests comprise the same values for particular attributes, but at different order. The solution may operate as follows:

For a particular system, coverage requirements of two types may be defined: 1. Standrard (unordered) CTD coverage requirements, in which each requirement is a tuple (t, A), where t is an integer and A is a subset of the attributes, wherein the requirement is: "for every subset of A having t attributes, any possible combination of values for the t attributes is tested at least once, regardless of the order". 2. Ordered coverage requirements: each requirement is a tuple (t, A) as above, that means "for every subset of A having t attributes, any possible combination of values for the t attributes is tested at least once in any possible order". The coverage requirements may be more specific, and may be limited to specific value combinations for specific attributes rather than to all value combinations of the attributes.

It will be appreciated that the combinatorial model may also comprise restrictions which may relate to the attribute values, to the order between attributes, or to both, e.g., "If A=x and B=y and A appears before B, then C must be z". It will be appreciated that restrictions may also be defined between order-related attributes and other attributes.

Before or after the coverage requirements are defined, an algorithm may be applied, which for a given integer n and level t ($t<=n$), determines a subset of the permutations of 1 . . . n, such that every t numbers appear in each of the possible t! permutations at least once. The algorithm or system executing the algorithm may be referred to as a "permutation engine". For example, if n=5 and t=2, it is required to determine permutations of 1.5 in which every pair of numbers i and j appears at least once such that i appears before j and at least once such that j appears before i. In this example, the two sequences 1, 2, 3, 4, 5 and 5, 4, 3, 2, 1 satisfy this requirement. The algorithm may be applied with n being the number of order-sensitive attributes in the model, thus generating a set of permutations of the attributes.

The testing model may then be augmented with Boolean attributes, each such attribute corresponding to one (explicit) order coverage requirement, and representing whether it is satisfied in a test. For example, if an order coverage requirement exists for the values of attributes A and B, respectively, then a first Boolean attribute may be added indicating "A before B".

Then, each permutation provided by the permutation engine is mapped into corresponding values to the Boolean attributes.

Then, a CTD system which re-uses parts of existing tests, as disclosed for example in U.S. patent application Ser. No. 13/437,945 incorporated herein by reference in its entirety, may operate on the augmented model, such that combinations of the new Boolean attributes are restricted to combinations generated by the mapping, which correspond to the determined permutations. Unordered coverage requirements may be determined by the system as is, while ordered requirements are handled in accordance with the mapped values for the original attributes and the new Boolean attributes.

A test suite may then be obtained by applying the reverse mapping, from the Boolean variables to the attribute order.

One technical effect of utilizing the disclosed subject matter is that each test in the output test suite assigns values to all original attributes of the problem at hand, as well as defines a permutation of the attributes for those attributes (or specific values) to which the order is of significance. This suite satisfies the coverage requirements, including the order coverage requirements between two or more attributes or attribute values, while reducing the number of required tests.

Referring now to FIG. 1, showing an example of an attribute collection, restriction set and attribute order, relating to a system under test. The system may be any apparatus, such as a software system, a hardware system, a machine, or the like.

The exemplary system has three Boolean attributes, A, B and C, as shown in element 104.

Table 108 shows the possible combinations for the order between the three variables.

Operating the permutations engine may provide that if level 2 order combination is applied to the combination, then the permutations of 1-2-3 and 3-2-1 appearing in the first and last rows of table 108 will suffice, while if level 3 order combination is applied to the combination, all permutations of 1, 2 and 3, represented by all rows of table 108 have to be used.

The order coverage requirements may be expressed as the Boolean attributes at the header row of table 112: "A before B", "B before C" and "A before C".

The permutations suggested in table 108 for the order coverage requirements are then translated into Y/N entries related to the attributes in table 112 in accordance with the particular variable order in each permutation.

A CTD algorithm may then be applied to the model represented as the original attributes A, B and C, possible additional restrictions and the added Boolean attributes. The CTD algorithm may be applied with a further restriction, that only assignments for the new Boolean attributes which correspond to the provided permutations (all rows in the case of 3-level coverage requirements, only the first and last rows in the case of level 2 coverage requirements) may be provided. Such assignment may include the values A=T, B=F, C=T as shown in combination 116 (suppose this is the only possible combination due to other restrictions) in all orders for 3-level coverage and in the two possibilities discussed above for 2-level coverage.

The values and orders may then be translated to the rows of table 120, in which the columns represent the first, second and third attributes to be set. If 3-level coverage is required than the combinations and order represented by all rows of table 120 are used, and if 2-level coverage is required only combinations and order represented by rows 124 and 128 are used.

It will be appreciated that table 120 refers to a single combination of values (A=T, B=F and C=T). If multiple combinations are out which complies with other restrictions, then more rows may be added to table 120 which may have the same order as any of the existing rows but comprises different values for attributes A, B and C. If the same order coverage requirements are imposed on all value combinations, then rows corresponding to the rows of table 120 will be provided for each such combination. However, it will be appreciated that different order coverage requirements may be imposed for different combinations.

Figure 2:
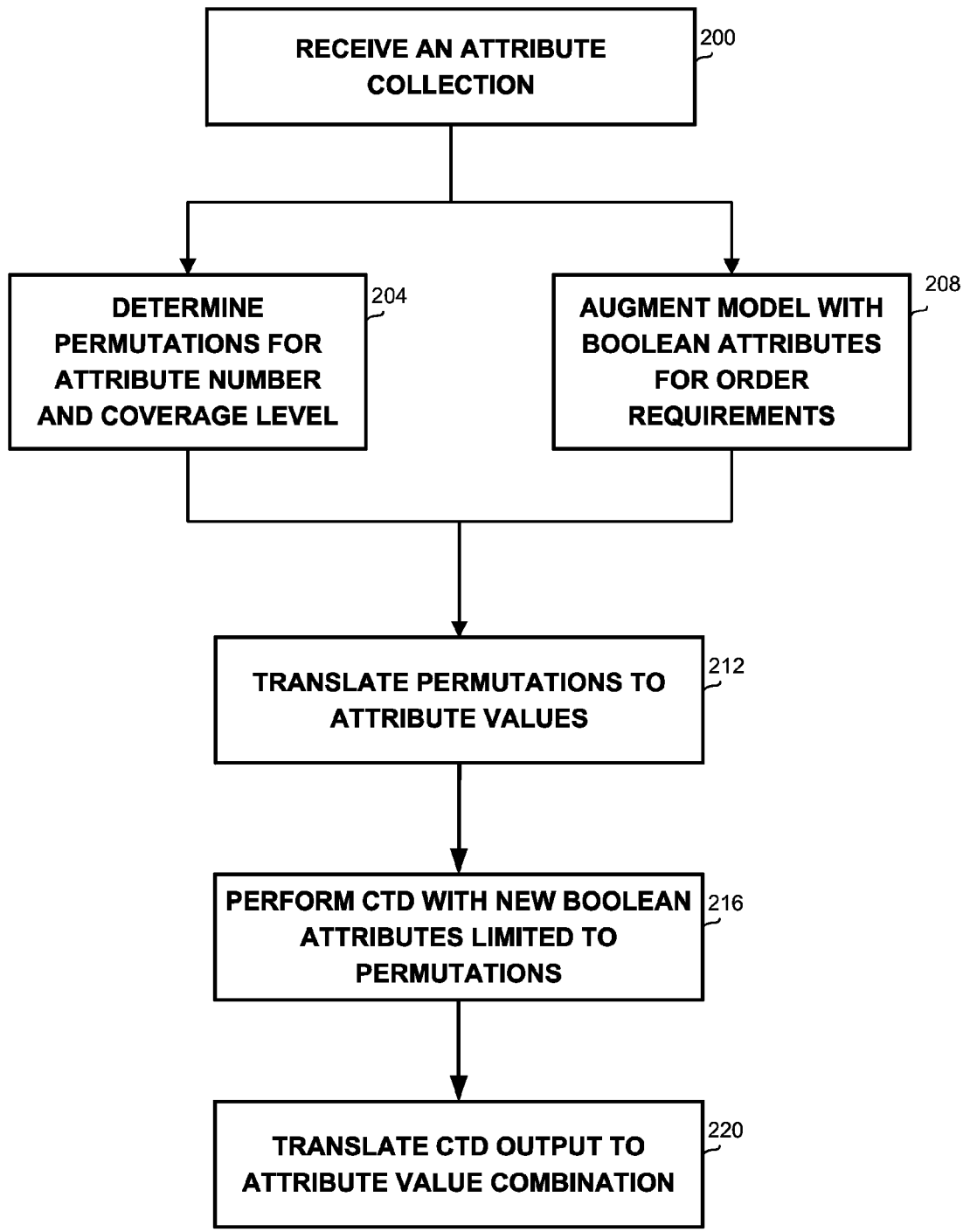
FIG. 2 shows a flowchart diagram of steps in a method for planning a test with order coverage requirements, in accordance with some exemplary embodiments of the disclosed subject matter.

Referring now to FIG. 2, showing a flowchart diagram of steps in a method for planning a test with order coverage requirements.

On step 200, a test model comprising an attribute collection associated with a domain or a system may be received. The attribute collection may also contain possible values for some or all of the attributes. For example, in the case of a healthcare system, the set of attributes may include a collection of patient demographic details, patient medical details, caregiver details, the details of a treatment provided by the caregiver to the patient, the details of the institute where the treatment was provided, or the like. In addition, the test model may comprise coverage requirements, such as level 2, level 3 or the like. Each coverage requirement may relate to some or all of the attributes, or to particular values or value combinations for the attributes. The test model may further comprise order coverage requirements, for example medical details should be received before an institute may be set. The test model may further comprise additional restrictions on values or value combinations.

It will be appreciated that step 200 may be preceded by a step in which a user provides the restrictions or order coverage requirements, For example, the user may indicate using a corresponding interface one or more attributes, one or more values, or one or more order coverage requirements for the attributes and values. For example, the user may indicate that attributes A, B and C should be tested with values a1 and a2 for attribute A, b1 for attribute B and c1 and c2 for attribute C in all possible combinations and all possible orders.

On step 204, permutations may be determined for the relevant number of attributes and the coverage requirements. The permutations may be determined, for example, as disclosed in "Combinatorial Methods for Event Sequence Testing" by Rick Kuhn, James Higdon, James Lawrence, Raghu Kacker and Yu Lei, published in Proceeding of ICST '12 Proceedings of the 2012 IEEE Fifth International Conference on Software Testing, Verification and Validation, pp. 601-609, incorporated herein by reference in its entirety.

On step 208, which may be performed before, after or concurrently with step 204, the testing model attributes may be augmented with Boolean attributes derived from the order coverage requirements. For example, if the model comprises three attributes and the required coverage is level 3, then a Boolean attribute may be generated for every relative order between the three values. The values of the Boolean attributes in a particular test will represent whether the attribute order within the test satisfies the relative order associated with the Boolean attributes.

On step 212, the permutations generated on step 204 may be translated into values for the Boolean attributes created on step 208.

On step 216, a test generation algorithm may be executed for the augmented attribute set, i.e., the original attributes and the new Boolean attributes representing relative order. The test generation may be performed by a CTD engine which re-uses parts of existing tests, since it is required to output only value combinations in which the values for the new Boolean attribute are as appear in any of the translated permutations generated on step 212. For example, such test generation may be performed as disclosed in U.S. patent application Ser. No. 13/437,945 incorporated herein by reference in its entirety.

Each test in the result test set assigns values to the original attributes, as well as to the new Boolean attributes which define a permutation of the original attributes, and thus represent the order in which the original attributes are to be set. Therefore, on step 220, for each generated test, the order of the attributes is retrieved by mapping the Boolean attribute values back to the associated permutation. This may be viewed as the reverse mapping or translation to the mapping or translation performed on step 212.

The resulting test assigns values to the attributes, and satisfies the coverage requirements, including the order-free coverage requirements and the requirements for which the order is significant.

Figure 3:
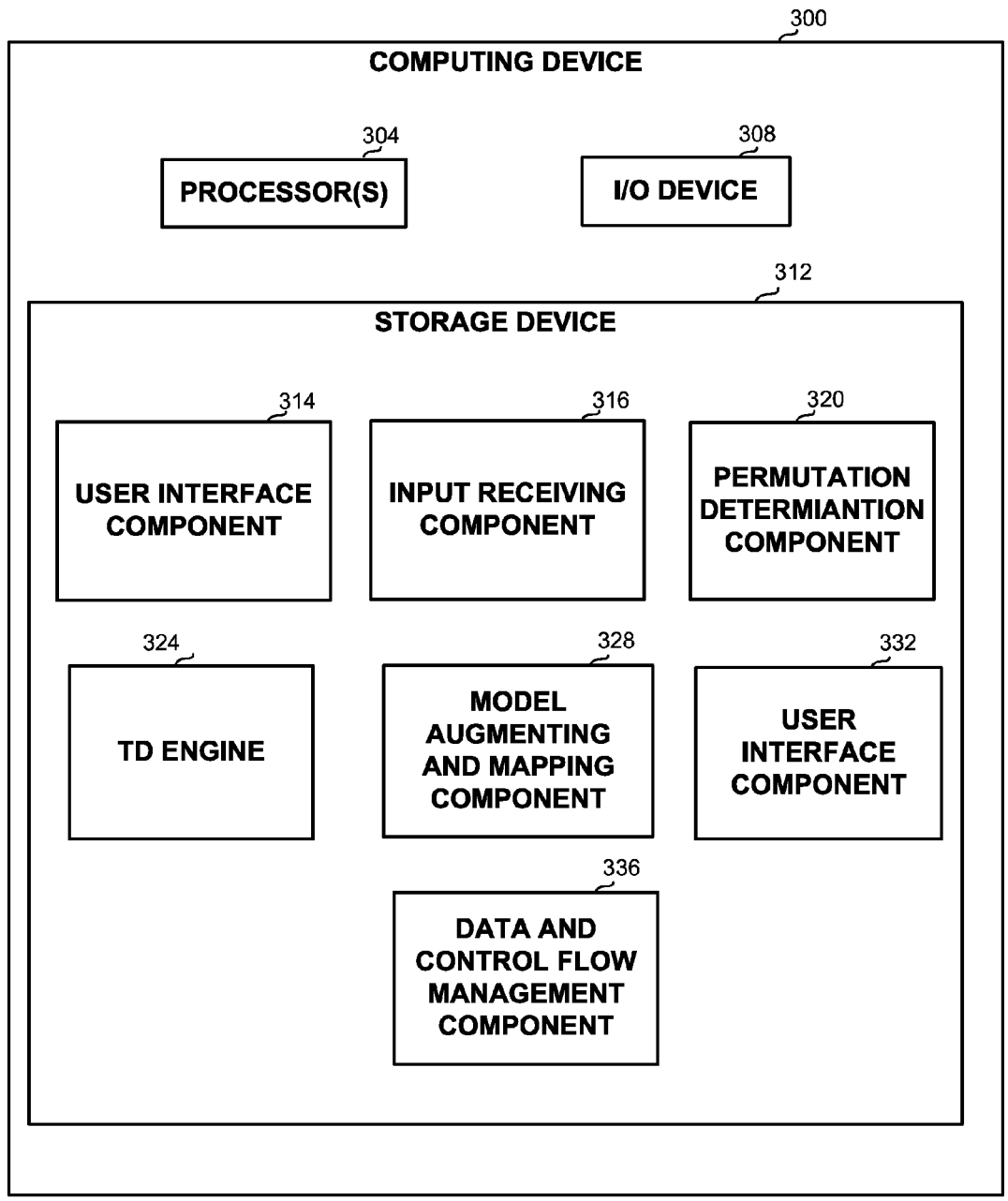
FIG. 3 shows a block diagram of components of an apparatus for planning a test with order coverage requirements, in accordance with some exemplary embodiments of the disclosed subject matter.

Referring now to FIG. 3, showing a block diagram of components of an apparatus for planning a test with order coverage requirements.

The apparatus may comprise a computing platform 300. Computing platform 300 may comprise a processor 304. Processor 304 may be a Central Processing Unit (CPU), a microprocessor, an electronic circuit, an Integrated Circuit (IC) or the like. Alternatively, computing platform 300 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processor 304 may be utilized to perform computations required by computing platform 300 or any of it subcomponents.

In some embodiments, computing platform 300 may comprise an input-output (I/O) device 308 such as a terminal, a display, a keyboard, an input device or the like, used to interact with the system, to invoke the system and to receive results. It will however be appreciated that the system can operate without human operation.

In some exemplary embodiments, computing platform 300 may comprise one or more storage devices such as storage device 312. Storage device 312 may be persistent or volatile. For example, storage device 312 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 312 may retain program code operative to cause processor 304 to perform acts associated with any of the steps shown in FIG. 2 above, for example generating permutations, performing CTD, or the like.

The components detailed below may be implemented as one or more sets of interrelated computer instructions, executed for example by processor 304 or by another processor. The components may be arranged as one or more executable files, dynamic libraries, static libraries, methods, functions, services, or the like, programmed in any programming language and under any computing environment.

Storage device 312 may comprise user interface component 314 for receiving input from a user through any I/O device, such as I/O device 308. The input may comprise indications to one or more attributes, one or more values, or one or more restrictions or order coverage requirements for the attributes and values. For example, the user may indicate that attributes A, B and C should be tested with values a1 and a2 for attribute A, b1 for attribute B and c1 and c2 for attribute C in all possible combinations and all possible orders. User interface component 314 may provide a user with tools for inputting data and for reviewing, updating or otherwise manipulating the data.

Storage device 312 may comprise an input receiving component 316 for receiving input, including for example the attribute set of the system to be tested, the possible values for each attribute, the coverage requirements, or additional data. The input may be received from user interface component 314, via a network, computer communication using any protocol, an external storage device, retrieved from a database, or the like.

Storage device 312 may further comprise permutation determination component 320 for determining permutations of n numbers or other entities with a level t such that every t numbers appear in each of the possible t! permutations at least once.

Storage device 312 may also comprise Test Design (TD) engine 324, which may be a CTD engine for determining tests for a group of attributes, in which the values or value combinations for some of the attributes are selected from existing tests or other known combinations. In the current context, these attribute values may be selected so as to comply with any of the generated permutations.

Storage device 312 may also comprise model augmenting and mapping component 328 for adding Boolean attributes to the regular attributes of the model, wherein the added attributes represent relative order between settings of the other attributes. Component 328 may also be responsible for mapping between a permutation and a value for the added Boolean attributes, depending on whether the permutation complies with the attribute or not, and vice versa. Model augmenting and mapping component 328 may be further responsible for the reverse mapping between values assigned to the initial attributes and to the Boolean attributes, and a test having the values as provided for the initial attributes, ordered in accordance with the values of the Boolean attributes.

Storage device 312 may also comprise User Interface (UI) module 332 which may be utilized to provide communication between the apparatus and a user, for providing input such as describing the attributes, values, coverage requirements, possibly other restrictions, receiving output such as suggested tests, or the like. User interface module may be responsible for displaying data, controls, or other elements, receiving commands and data from the user and communicating the data to other components.

Storage device 312 may also comprise data and control flow management component 336 for managing the flow of information and control between other components, for example storing the attributes and values received by user interface component 332, using permutations determined by permutation determination component 320 and added attributes created by model augmenting and mapping component 328 as input for CTD component 324, or the like.

The disclosed method and apparatus enable the generation of tests in accordance with user-provided coverage requirements. The disclosed method and apparatus is operative in providing the required coverage with a reduced number of tests to enhance efficiency.

It will be appreciated that handling order coverage requirements may be extended in a manner corresponding to the handling of other coverage requirements, using test planning tools such as CTD tools.

For example, coverage analysis related also to order coverage requirements may be performed: given a model, existing tests, and a set of requirements which includes order coverage requirements, it may be analyzed and determined to what extent the existing tests cover the requirements, and in particular the order requirements.

In another example, test selection related also to order coverage requirements may be performed: given a model, existing tests, and a set of requirements which includes order coverage requirements, it may be analyzed and determined whether and which subset of the tests may maintain the same coverage as the given set, relating also to the order coverage requirements.

In yet another example, test enhancement related also to order coverage requirements may be performed: given a model, existing tests, and a set of requirements which includes order coverage requirements, new tests may be generated which fill coverage gaps in the existing tests, and in particular gaps in the order coverage requirements.

It will be appreciated that multiple enhancements and modifications may exist to the method and apparatus.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a computerized device, comprising:
   receiving a combinatorial testing model comprising an attribute collection, the attribute collection comprising a predetermined number of initial attributes, at least one possible value for each of the initial attributes, a coverage requirement, and an order coverage requirement for at least some of the initial attributes, the order coverage requirement related to predetermined relative order in which the values are to be applied to the initial attributes;
   providing at least two tests in which each of the initial attributes is assigned a value from the at least one possible value,
   wherein the at least two tests satisfy the order coverage requirement;
   determining permutations for the predetermined number and the coverage requirement;
   augmenting the initial attributes with at least one Boolean attribute, the at least one Boolean attribute associated with the order coverage requirement;
   mapping the permutations to values for the Boolean attributes;
   performing test design for the testing model with the at least one Boolean attribute, to obtain tests in which value combinations for the at least one Boolean attribute are selected in accordance with the values mapped from the permutations; and
   mapping the tests into values for the attributes, wherein the initial attributes are ordered in accordance with the values assigned to the at least one Boolean attribute.

2. The computer-implemented method of claim 1, wherein the test design is Combinatorial Test Design in which value combinations for some attributes are to be selected from a predetermined collection of value combinations.

3. The computer-implemented method of claim 1, wherein the order coverage requirement relates to the initial attributes.

4. The computer-implemented method of claim 1, wherein the order coverage requirement relates to a subset of the initial attributes.

5. The computer-implemented method of claim 1, wherein the combinatorial testing model comprises restrictions for the initial attributes, such that only certain orders may be applied.

6. An apparatus having a processor and a storage device, the apparatus comprising:
   receiving a combinatorial testing model comprising an attribute collection, the attribute collection comprising a predetermined number of initial attributes, at least one possible value for each of the initial attributes, a coverage requirement, and an order coverage requirement for at least some of the initial attributes;
   a test design engine for performing test design for the testing model, to obtain at least two tests in which each of the initial attributes is assigned a value from the at least one possible value, wherein the at least two tests satisfy the order coverage requirement;
   a permutation determination component for determining permutations for the predetermined number and the coverage requirement; and
   a model augmenting and mapping component for augmenting the initial attributes with at least one Boolean attribute, the at least one Boolean attribute associated with the order coverage requirement, for mapping the permutations to values for the at least one Boolean attribute, and for mapping tests into values wherein the initial attributes are ordered in accordance with values assigned to the at least one Boolean attribute,
   wherein the a test design engine is adapted to generate the at least two tests such that value combinations for the at least one Boolean attribute are selected in accordance with the values mapped form the permutations.

7. The apparatus of claim 6, wherein the test design engine is a Combinatorial Test Design engine adapted to assign value combinations for some attributes, which are to be selected from a predetermined collection of value combinations.

8. The apparatus of claim 6, wherein the order coverage requirement relates to the initial attributes.

9. The apparatus of claim 6, wherein the order coverage requirement relates to a subset of the initial attributes.

10. The apparatus of claim 6, wherein the combinatorial testing model comprises restrictions for the initial attributes, such that only certain orders may be applied.

11. The apparatus of claim 6 further comprising a user interface component for receiving input from a user, the input associated with order coverage requirements related to the initial attributes.

12. A computer program product comprising:
   a non-transitory computer readable medium;
   a first program instruction for receiving a combinatorial testing model comprising an attribute collection, the attribute collection comprising a predetermined number of initial attributes, at least one possible value for each of the initial attributes, a coverage requirement, and an order coverage requirement for at least some of the initial attributes, the order coverage requirement related to predetermined relative order in which the values are to be applied to the initial attributes; and
   a second program instruction for providing at least two tests in which each of the initial attributes is assigned a value from the at least one possible value,
   wherein the at least two tests satisfy the order coverage requirement;
   a third program instruction for determining permutations for the predetermined number and the coverage requirement;
   a fourth program instruction for augmenting the initial attributes with at least one Boolean attribute, the at least one Boolean attribute associated with the order coverage requirement;
   a fifth program instruction for mapping the permutations to values for the Boolean attributes;
   a sixth program instruction for performing test design for the testing model with the at least one Boolean attribute, to obtain tests in which value combinations for the at least one Boolean attribute are selected in accordance with the values mapped from the permutations; and
   a seventh program instruction for mapping the tests into values for the attributes, wherein the initial attributes are ordered in accordance with the values assigned to the at least one Boolean attribute,
   wherein said first, second, third, fourth, fifth, sixth and seventh program instructions are stored on said non-transitory computer readable medium.

* * * * *